US011222750B1

(12) United States Patent
Macaluso

(10) Patent No.: US 11,222,750 B1
(45) Date of Patent: Jan. 11, 2022

(54) HYPERCAPACITOR APPARATUS FOR STORING AND PROVIDING ENERGY

(71) Applicant: Anthony Macaluso, San Diego, CA (US)

(72) Inventor: Anthony Macaluso, San Diego, CA (US)

(\*) Notice: Subject to any disclaimer, the term of this patent is extended or adjusted under 35 U.S.C. 154(b) by 0 days.

(21) Appl. No.: 17/332,088

(22) Filed: May 27, 2021

Related U.S. Application Data

(60) Provisional application No. 63/164,474, filed on Mar. 22, 2021.

(51) Int. Cl.
*H02J 7/34* (2006.01)
*B60L 50/40* (2019.01)
*H01G 4/228* (2006.01)
*B60L 53/38* (2019.01)

(52) U.S. Cl.
CPC .............. *H01G 4/228* (2013.01); *B60L 50/40* (2019.02); *B60L 53/38* (2019.02); *H02J 7/345* (2013.01); *H02J 2207/50* (2020.01)

(58) Field of Classification Search
CPC ...... H01G 4/228; H02J 7/345; H02J 2207/50; B60L 53/38; B60L 50/40
See application file for complete search history.

(56) References Cited

U.S. PATENT DOCUMENTS

| 8,907,631 | B1* | 12/2014 | Gurries | H02J 7/0077 320/138 |
| 2003/0139859 | A1* | 7/2003 | Hanada | B60L 58/10 701/22 |
| 2003/0184258 | A1* | 10/2003 | VonderHaar | H02J 7/345 320/103 |
| 2010/0117600 | A1* | 5/2010 | Fazakas | H02J 7/345 320/128 |
| 2013/0266826 | A1* | 10/2013 | Cowperthwaite | H01M 16/00 429/7 |
| 2014/0197780 | A1* | 7/2014 | Imamura | H02J 7/027 320/107 |
| 2017/0117720 | A1* | 4/2017 | Yung | H02J 7/342 |

\* cited by examiner

*Primary Examiner* — Richard Isla
*Assistant Examiner* — Johali A Torres Ruiz
(74) *Attorney, Agent, or Firm* — Knobbe, Martens, Olson & Bear, LLP

(57) ABSTRACT

A hypercapacitor energy storage system or device facilitates fast charging, stable energy retention, high energy to weight storage and the like. The hypercapacitor comprises an ultracapacitor in electrical connection with an energy retainer which may comprise a battery, a battery field, a standard capacitor and/or the like. The electrical connection between the ultracapacitor and energy retainer may stabilize the energy retention of the hypercapacitor and provide for long-term energy storage and prevent self-discharge. The hypercapacitor may be electrically couplable to an energy source such as the utility grid via a low voltage outlet (e.g., 110V or 220V) or other charging system and may undergo fast charging. The hypercapacitor may be electrically couplable to and/or integrated with various systems or devices requiring energy storage and/or usage and may provide energy thereto.

20 Claims, 12 Drawing Sheets

|  |  | Ultracapacitor Voltage (voltage generated) | Battery Field Voltage (voltage used) |
|---|---|---|---|
| Start 0 |  | 352.4 | 351.2 |
| Mile 1 |  | 345.3 | 346.0 |
| Mile 2 | Front Side of T | 345.4 | 346.61 |
| Mile 3 |  | 345.4 | 347.96 |
| Mile 4 |  | 345.4 | 347.7 |
| Mile 5 |  | 345.4 | 347.0 |
| Mile 6.3 | Gate | 345.5 | 348.54 |
| Mile 6.6 |  | 345.5 | 349.02 |
| Mile 8 |  |  |  |
| Finish |  |  |  |
| Finished Voltage Minus Starting Voltage |  |  |  |

*43mph / 44mph* — -2

FIG. 10

HYPERCAPACITOR APPARATUS FOR STORING AND PROVIDING ENERGY

CROSS REFERENCE TO RELATED APPLICATIONS

This application claims benefit of priority to U.S. Provisional Patent Application No. 63/164,474, filed Mar. 22, 2021. This application is related to U.S. patent application Ser. No. 17/141,518, filed Jan. 5, 2021, which is a continuation-in-part of U.S. patent application Ser. No. 16/847,538, filed Apr. 13, 2020, which claims benefit of priority and is related to U.S. Provisional Patent Application No. 62/858,902, filed Jun. 7, 2019, U.S. Provisional Patent Application No. 62/883,523, filed Aug. 6, 2019, and U.S. Provisional Patent Application No. 62/967,406, filed Jan. 29, 2020. The disclosure of each of the aforementioned applications is incorporated herein in its entirety for all purposes.

FIELD OF THE DISCLOSURE

The present disclosure relates generally to systems and devices for receiving, storing and providing energy. More specifically, the present disclosure relates to a hypercapacitor energy storage system or device that may provide energy charging, storing and providing capabilities that are superior to existing energy devices or systems such as batteries, ultracapacitors, supercapacitors and the like. Additionally, the hypercapacitor can be integrated, for example, in a modular manner, with various devices or systems that require energy storage and/or usage and may provide energy thereto.

BACKGROUND

Existing energy storage devices, such as batteries and capacitors, can be useful for storing energy but may have many undesirable limitations. For example, batteries such as lithium ion batteries are resilient to self-discharge but often require long charge times (e.g., 12-14 hours). In contrast, capacitors, such as ultracapacitors and supercapacitors are capable of being charged quickly (i.e., faster than batteries) but may be much less resistant to self-discharge than batteries. For example, ultracapacitors/supercapacitors may lose as much as 10-20% of their charge per day due to self-discharge. Further, although ultracapacitors/supercapacitors may be capable of withstanding more charge-discharge cycles than batteries without losing operational functionality, ultracapacitors/supercapacitors may not be capable of storing as much energy per weight as batteries.

In addition, batteries, such as lithium ion batteries present many environmental problems. For example, mining and disposing of lithium are both environmentally destructive. Furthermore, lithium ion batteries are capable of catching fire and burning at high temperatures for long amounts of time, which is also environmentally destructive and hazardous to human health.

SUMMARY

Given the limitations of current energy storage devices (e.g., batteries, capacitors) in use today, an energy storage device is needed that may integrate, or marry, the benefits of standard storage devices (e.g., storage capacitors, battery fields, or battery storage devices) and standard ultracapacitors/supercapacitors (e.g., can charge quickly, is stable or resilient to self-discharge or bleeding of voltage. Some benefits of such an energy storage system might be that it may include high or superior energy to weight ratio, it can fully charge from and is couplable to the utility grid via a standard 110 volt or 220 volt outlet, and/or can draw down voltage storage levels all the way down to 0 volts without jeopardizing degradation of performance or failure of the storage device) in a unitary device or package.

The present disclosure provides for an energy storage system (e.g., the hypercapacitor described below) that can incorporate ultracapacitors/supercapacitors and storage devices (e.g., capacitors, batteries) in a single assembly (e.g., as a single integrated unit or package) to provide synergistic results, or results that are not achievable, or are substantially reduced, when provided or used separately.

The hypercapacitor (e.g., electrically integrated ultracapacitor/supercapacitor and energy storage device or energy retainer) overcomes the problems discussed herein. For example, the hypercapacitor can be charged much faster than a standalone battery (discussed in greater detail below) while simultaneously being much more resilient to self-discharge (i.e., maintains stable voltage levels within minimal bleeding) than a standalone ultracapacitor/supercapacitor due to energy stabilization between the ultracapacitor/supercapacitor and energy storage device or energy retainer (e.g., storage capacitor(s), battery field, and/or battery storage device(s) discussed in greater detail below).

Additionally, the hypercapacitor may be capable of storing much more energy per weight than standalone storage devices, battery fields, or ultracapacitors/supercapacitors. In some implementations, the hypercapacitor does not include batteries (such as lithium-ion batteries) that are known to have a detrimental impact on the environment (for example, once they become environmental waste product after battery failure or exhaustion). Thus, the hypercapacitor, described in greater detail below, provides for a superior energy storage device over standard energy storage devices in use today. The hypercapacitor may be incorporated into any device or system that requires energy storage and/or usage such as electric vehicles for transportation (e.g., electric cars, electric trucks, electric motorcycles, electric scooters, electric trains, electric boats, electric aircraft), electric vehicles or electric equipment for construction or farming (e.g., tractors, bulldozers, lawnmowers), power tools that have typically been powered by batteries (e.g., electric blowers, electric drills, electric lawnmowers, electric nail guns, electric saws), building energy/power systems, manufacturing energy/power systems, games, drones, robots, toys and the like. The hypercapacitor may replace standard energy storage devices (e.g., standard batteries, capacitors) in any of the devices or systems described.

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides a hypercapacitor apparatus for storing and providing energy. The apparatus may comprise: a capacitor module which may be electrically couplable to an energy source via one or more inbound diodes, wherein the one or more inbound diodes may be biased toward the capacitor module and wherein the capacitor module may be configured to: receive, via the one or more inbound diodes, inbound energy from the energy source; and store the inbound energy as a first energy in an electric field of the capacitor module. The apparatus may further comprise an energy retainer which may be electrically coupled to the capacitor module via one or more outbound diodes, wherein the one or more outbound diodes may be biased toward the energy retainer and wherein the energy retainer may be configured to: receive, via the one or more outbound diodes, outbound energy from the capacitor module in response to a voltage level of the energy retainer dropping below a low threshold value; store said outbound energy as a second energy of the energy retainer; and convey the second energy to a load.

In some embodiments, the energy source may be a utility grid and the capacitor module may be further configured to: be electrically couplable to the utility grid via a standard 110 volt or 220 volt outlet; and increase the first energy by a voltage capacity of the capacitor module in less than 30 minutes; and the energy retainer may be further configured to not receive outbound energy from the capacitor module in response to a voltage level of the energy retainer reaching a high threshold voltage value.

In some embodiments, the energy source may be a power generation system.

In some embodiments, the capacitor module may comprise one or more ultracapacitors and/or supercapacitors.

In some embodiments, the energy retainer may comprise one or more batteries.

In some embodiments, the energy retainer may comprise one or more capacitors.

In some embodiments, the energy retainer may not comprise lithium ion batteries.

In some embodiments, the energy retainer and the capacitor module may comprise a single integrated unit.

In some embodiments, the energy retainer may be electrically coupled to the capacitor module via one or more high voltage lines.

In some embodiments, the electrical coupling between the energy retainer and the capacitor module may stabilize the voltage of the capacitor module to prevent voltage loss of the first energy of the capacitor module due to self-discharge.

In some embodiments, the energy retainer may be configured to receive outbound energy from the capacitor module via the one or more outbound diodes based, at least in part, on a current voltage level of the capacitor module.

In some embodiments, the energy retainer may be configured to receive outbound energy from the capacitor module via the one or more outbound diodes based, at least in part, on a resistance in the one or more outbound diodes.

In some embodiments, the hypercapacitor may further comprise a battery management system, wherein the battery management system may be electrically coupled to the energy retainer and may be configured to monitor the energy conveyed from the energy retainer to the load and control when the energy retainer conveys energy to the load.

In some embodiments, the energy retainer may be further configured to convey all of the second energy to the load.

The present disclosure provides a hypercapacitor apparatus for storing and providing energy. The apparatus may comprise: a capacitor module electrically couplable to an energy source and wherein the capacitor module may be configured to: receive inbound energy from the energy source; and store the inbound energy as a first energy in an electric field of the capacitor module. The apparatus may further comprise an energy retainer electrically coupled to the capacitor module wherein the energy retainer and the capacitor module may comprise a single integrated unit and wherein the energy retainer may be configured to: receive outbound energy from the capacitor module to stabilize the voltage of the capacitor module to prevent voltage loss of the first energy of the capacitor module due to self-discharge; store said outbound energy as a second energy of the energy retainer; and convey the second energy to a load.

In some embodiments, the energy source may be a utility grid and wherein the capacitor module may be further configured to: be electrically couplable to the utility grid via a standard 110 volt or 220 volt outlet; and wherein the energy retainer may be further configured to: receive, outbound energy from the capacitor module in response to a voltage level of the energy retainer dropping below a low threshold value; and not receive outbound energy from the capacitor module in response to a voltage level of the energy retainer reaching a high threshold voltage value.

In some embodiments, the capacitor module may comprise one or more ultracapacitors and/or supercapacitors and wherein the energy retainer may comprise one or more batteries.

The present disclosure provides a hypercapacitor apparatus for storing and providing energy. The hypercapacitor apparatus may comprise: a capacitor module electrically couplable to an energy source and wherein the capacitor module may comprise a first plurality of capacitors and a second plurality of capacitors, and wherein the capacitor module may be configured to: receive, at the first or second plurality of capacitors, inbound energy from the energy source, and store, at the first or second plurality of capacitors, the inbound energy as a first energy as an electric field of the capacitor module. The hypercapacitor apparatus may further comprise an energy retainer electrically coupled to the capacitor module and wherein the energy retainer may be configured to: receive outbound energy conveyed from the first or second plurality of capacitors in response to a voltage level of the energy retainer dropping below a low threshold value; store said outbound energy as a second energy of the energy retainer; and convey the second energy to a load In some embodiments, the first plurality of capacitors may receive the inbound energy while the second plurality of capacitors may convey the first energy to the energy retainer or wherein the second plurality of capacitors may receive the inbound energy while the first plurality of capacitors may convey the first energy to the energy retainer.

In some embodiments, the first plurality of capacitors may alternate between receiving the inbound energy and conveying the first energy to the energy retainer, and wherein the second plurality of capacitors may alternate between receiving the inbound energy and conveying the first energy to the energy retainer.

BRIEF DESCRIPTION OF THE DRAWINGS

FIG. 10 illustrates a chart of example data relating to voltage generation and usage of a power generation or charging system and a hypercapacitor while operating in an electric vehicle while travelling a distance.

Figure 1A:
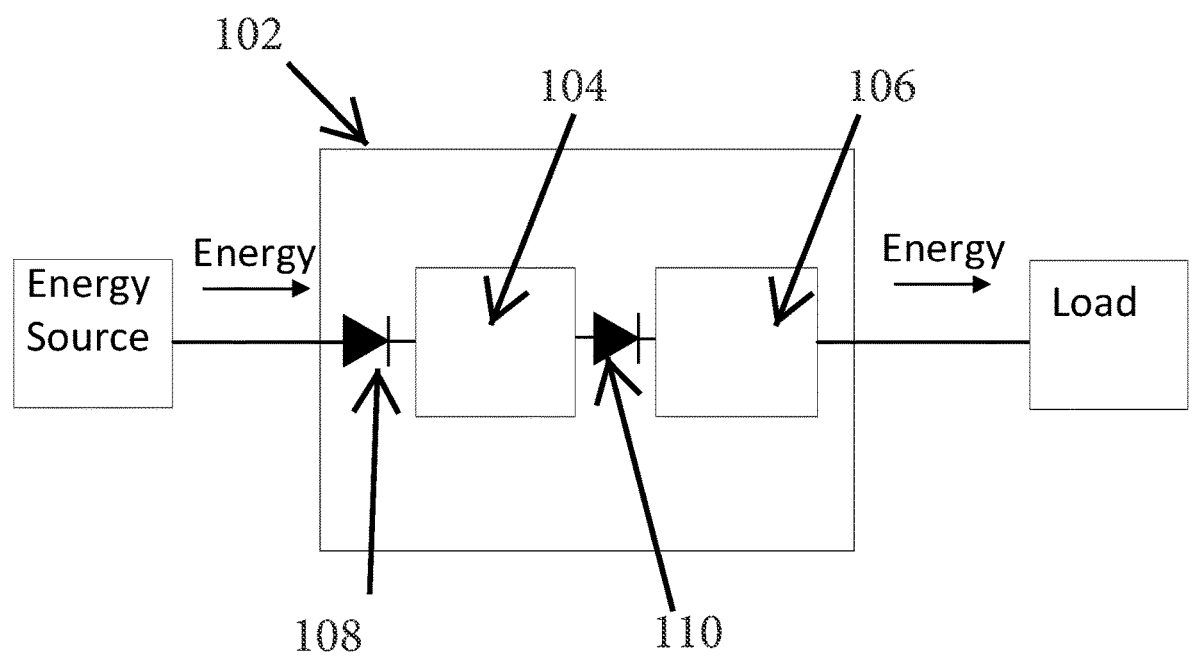
FIG. 1A-1B illustrate diagrams of example embodiments of a hypercapacitor for receiving energy, storing energy and providing energy.

The various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Overview

The present disclosure provides for a hypercapacitor energy storage system or hypercapacitor that can integrate or marry ultracapacitors/supercapacitors and storage devices (e.g., capacitors, batteries) in a single assembly (e.g., as a single integrated unit or package) to provide synergistic results, or results that are not achievable, or are substantially reduced, when provided or used separately. For example, the hypercapacitor can be charged much faster than a standalone battery, the hypercapacitor is capable of retaining energy for a long storage life without losing energy due to self-discharge, the hypercapacitor may be capable of storing much more energy per weight than standalone storage devices (e.g., batteries, standard capacitors), and the hypercapacitor can draw down voltage storage levels down to 0 volts without risking device performance failure such as is common for example with standard lithium ion batteries which cannot draw voltage below a low threshold capacity.

Thus, the hypercapacitor, described herein, provides for a superior energy storage device over standard energy storage devices in widespread use today. Furthermore, the hypercapacitor may replace standard energy storage devices in any device or system that uses them. For example, the hypercapacitor may replace standard energy storage devices and/or may be used in electric vehicles for transportation, electric vehicles or electric equipment for construction or farming, power tools, building energy/power systems, manufacturing energy/power systems, games, drones, robots, toys, computers, electronics and the like.

Example Hypercapacitor for Storing Energy

FIG. 1A schematically illustrates a diagram of an example embodiment of a hypercapacitor 102 for storing energy (e.g., such as may be used in an electric vehicle or any other device that requires use of energy typically stored in a rechargeable power supply), which may also be referred to as a hypercapacitor energy storage system or device. As shown, the hypercapacitor 102 may comprise or consist essentially of an ultracapacitor portion 104, an energy retainer 106, one or more inbound diodes 108, and optionally one or more outbound diodes 110. In some embodiments, the hypercapacitor 102 may not comprise the inbound diode 108 and/or the outbound diode 110. In some embodiments, the hypercapacitor 102 may comprise and/or may be electrically coupled to a battery management system (such as of an electric vehicle) as discussed in greater detail below.

The ultracapacitor portion 104 may be electrically coupled to the energy retainer 106 and in some embodiments, together may comprise a single integrated unit, housing, or package (e.g., the hypercapacitor 102). The ultracapacitor portion 104 may provide energy to the energy retainer 106 as the energy in the energy retainer 106 is depleted (for example resulting from an energy demand at a load). The hypercapacitor 102 can advantageously be used to replace a rechargeable battery or power supply of any electric device.

The electrical connection between the ultracapacitor portion 104 and the energy retainer 106 may advantageously stabilize the voltage levels of the ultracapacitor portion 104 and prevent self-discharge as the energy retainer 106 retains energy provided from the ultracapacitor portion 104 via their electrical connection. Advantageously, stabilizing the voltage levels in the ultracapacitor portion 104 by reducing and/or substantially eliminating self-discharge or bleeding provides a superior energy device capable of storing energy (e.g., maintaining high voltage levels) for much longer than existing energy devices in widespread use today.

The ultracapacitor portion 104 may be electrically coupled to an energy source as described in greater detail below for example with reference to FIG. 1B. By receiving energy from the energy source at the ultracapacitor portion 104, the hypercapacitor 102 may be charged quickly, for example, in less than 15 minutes (e.g., less than 12 minutes, less than 10 minutes, less than 8 minutes, less than 4 minutes, less than 2 minutes, etc., depending on the current voltage level and capacity of the device). Advantageously, the ultracapacitor portion 104 may facilitate quickly charging the hypercapacitor 102 to the required or desired operational voltages in much shorter times than those required for standard energy devices (e.g., standard batteries) in use today.

The ultracapacitor portion 104 of the hypercapacitor 102 may comprise one or more ultracapacitors and/or supercapacitors. The energy retainer portion 106 may comprise a device or multiple devices capable of storing or retaining energy such as a battery, a battery field and/or a capacitor. For example, in some embodiments the energy retainer portion 106 may include a battery, a battery field such as the battery fields shown in FIGS. 3-4. In some embodiments, the energy retainer portion 106 may comprise one or more capacitors, such as standard storage capacitors. In accordance with several embodiments, the energy retainer portion 106 may advantageously not comprise lithium ion batteries, which may provide a benefit to quality of the environment for any or all of the reasons discussed herein. In some embodiments, the energy retainer portion 106 may comprise lithium ion batteries.

The hypercapacitor 102 may be electrically couplable to an energy source, such as a power generation or charging system or the utility grid via a standard outlet plug and configured to receive energy as inbound energy from the energy source. The hypercapacitor 102 may be configured to receive the inbound energy at the ultracapacitor portion 104. The ultracapacitor portion 104 may receive the inbound energy via one or more inbound diodes 108. The inbound diode(s) 108 may bias the direction of energy flow into the ultracapacitor portion 104. The inbound diode(s) 108 may comprise one or more diodes per ultracapacitor in embodiments where the ultracapacitor portion 104 comprises more than one ultracapacitor. The inbound diode(s) 108 may be arranged in series.

In some embodiments, the energy source may provide energy to the ultracapacitor portion 104 when resistance in the inbound diode 108 is sufficiently small and/or when the voltage in the ultracapacitor portion 104 is sufficiently low. The amount of energy and/or the rate at which energy is provided to the ultracapacitor portion 104 may be proportional to the resistance in the inbound diode 108 and/or the voltage level of the ultracapacitor portion 104. For example, the ultracapacitor portion 104 may charge quicker (faster) when it has a low voltage level than when it has a high voltage level. In some embodiments, the energy source may stop providing energy to the ultracapacitor portion 104 when the resistance in the inbound diode 108 is sufficiently high and/or when the voltage level of the ultracapacitor portion 104 reaches a high threshold level, such as a high voltage level (e.g., more than 400 V), or any other voltage required or desired to operate the system.

As discussed in greater detail below, energy provided to the ultracapacitor portion 104 from the energy source may charge the ultracapacitor portion 104 and/or the hypercapacitor 102 quickly (e.g., much faster than standard existing energy devices such as batteries). For example, the ultracapacitor portion 104 and/or the hypercapacitor 102 may be charged (e.g., increase from zero volts to a required operational voltage or voltage capacity) in less than 15 minutes. For example, the ultracapacitor portion 104 and/or the hypercapacitor 102 may be charged in 10 minutes, 8 minutes, 4 minutes, 1 minute, 30 seconds etc. The charge time may vary based at least in part on operational voltage requirements of the device with which the hypercapacitor 102 is integrated and/or the energy source provided to the hypercapacitor 102.

The inbound energy provided to the hypercapacitor 102 may charge the ultracapacitor portion 104. The one or more ultracapacitors of the ultracapacitor portion 104 may be charged simultaneously or sequentially. For example, one ultracapacitor may receive energy from an energy source while one or more other ultracapacitors are not receiving energy from the energy source. The one or more ultracapacitors of the ultracapacitor portion 104 may be sequentially charged in an order that is determined based, at least in part, on their existing charge level. For example, an ultracapacitor that has the lowest charge level may be charged prior to other ultracapacitors with higher charge levels. Each ultracapacitor may be fully charged or charged to a certain threshold charge level before a subsequent ultracapacitor is charged.

As discussed in greater detail below, the ultracapacitor portion 104 may provide energy to the energy retainer portion 106. The one or more ultracapacitors of the ultracapacitor portion 104 may provide energy to the energy retainer portion 106 simultaneously or sequentially. For example, one ultracapacitor may provide energy to the energy retainer portion 106 while one or more other ultracapacitors are not providing energy to the energy retainer portion 106. The one or more ultracapacitors of the ultracapacitor portion 104 may sequentially provide energy to the energy retainer portion 106 in an order that is determined based, at least in part, on their existing charge level. For example, an ultracapacitor that has the highest charge level may provide energy to the energy retainer portion 106 prior to other ultracapacitors with lower charge levels. Each ultracapacitor may provide energy to the energy retainer portion 106 until their energy is entirely depleted (e.g., zero volts) and/or reaches a low threshold level before a subsequent ultracapacitor commences providing energy to the energy retainer portion 106.

In some embodiments, the one or more ultracapacitors of the ultracapacitor portion 104 may receive energy from the energy source at the same time as providing energy to the energy retainer portion 106. In some embodiments, the ultracapacitors of the ultracapacitor portion 104 may not receive energy from the energy source at the same time as providing energy to the energy retainer portion 106. In some embodiments, the ultracapacitors of the ultracapacitor portion 104 may toggle between receiving energy from the energy source and providing energy to the energy retainer portion 106. In some embodiments, some ultracapacitors may receive energy from the energy source, while other ultracapacitors provide energy to the energy retainer portion 106.

As shown in FIG. 1A, the ultracapacitor portion 104 may be electrically coupled to the energy retainer portion 106. In some embodiments, the ultracapacitor portion 104 may be directly connected to the energy retainer portion 106. For example, the ultracapacitor portion 104 and the energy retainer portion 106 may comprise a single integrated unit or package. In some embodiments, the ultracapacitor portion 104 may be wired to the energy retainer portion 106 and/or connected via one or more high voltage lines. The ultracapacitor portion 104 may provide energy to the energy retainer portion 106 to charge the energy retainer portion 106. In some embodiments, the ultracapacitor portion 104 may provide energy to the energy retainer portion 106 via one or more outbound diodes 110. The outbound diode(s) 110 may be arranged in series. The outbound diode(s) 110 may bias the direction of flow of energy into the energy retainer portion 106. The ultracapacitor portion 104 may toggle between providing energy to the energy retainer portion 106 and not providing energy to the energy retainer portion 106 and may so toggle automatically and/or manually as discussed herein.

In some embodiments, the ultracapacitor portion 104 may provide energy to the energy retainer portion 106 when resistance in the outbound diode 110 is sufficiently small and/or when the voltage in the energy retainer portion 106 is sufficiently low. The low voltage threshold level of the energy retainer portion 106 at which the energy retainer portion 106 begins receiving energy from the ultracapacitor portion 104 may be based at least in part on the voltage capacity of the energy retainer portion 106 and/or the ultracapacitor portion 104 and/or the operational voltage requirements of the system to which the hypercapacitor 102 provides energy. In some embodiments, the ultracapacitor portion 104 may provide energy to the energy retainer portion 106 when the voltage in the energy retainer portion 106 is sufficiently low relative to a voltage level in the ultracapacitor portion 104. The amount of energy and/or the rate at which energy is provided to the energy retainer portion 106 may be proportional to the resistance in the outbound diode 110 and/or the voltage level of the energy retainer portion 106. For example, the energy retainer portion 106 may charge quicker (faster) when it has a low voltage than when it has a high voltage. In some embodiments, the ultracapacitor portion 104 may stop providing energy to the energy retainer portion 106 when the resistance in the outbound diode 110 is sufficiently high and/or when the voltage level of the energy retainer portion 106 reaches a high threshold level. The high voltage threshold level of the energy retainer portion 106 at which the energy retainer portion 106 stops receiving energy from the ultracapacitor portion 104 may be based at least in part on the voltage capacity of the energy retainer portion 106 and/or the ultracapacitor portion 104 and/or the operational voltage requirements of the system to which the hypercapacitor 102 provides energy.

The electrical connection of the ultracapacitor portion 104 to the energy retainer portion 106 may stabilize the voltage in the ultracapacitor portion 104. For example, the ultracapacitor portion 104 may maintain a high voltage level and may not lose voltage due to self-discharge because the ultracapacitor portion 104 is coupled to the energy retainer portion 106 and/or is able to provide energy thereto. Thus, the electrical connection of the ultracapacitor portion 104 to the energy retainer portion 106 may advantageously eliminate the high self-discharge rate problems associated with standard capacitors while also providing a system capable of fast charge times. Thus, the hypercapacitor 102 described herein may provide an energy storage system capable of charging quickly and storing energy for long amounts of time without having the drawbacks or inefficiencies of standard battery or capacitor systems.

Figure 1B:
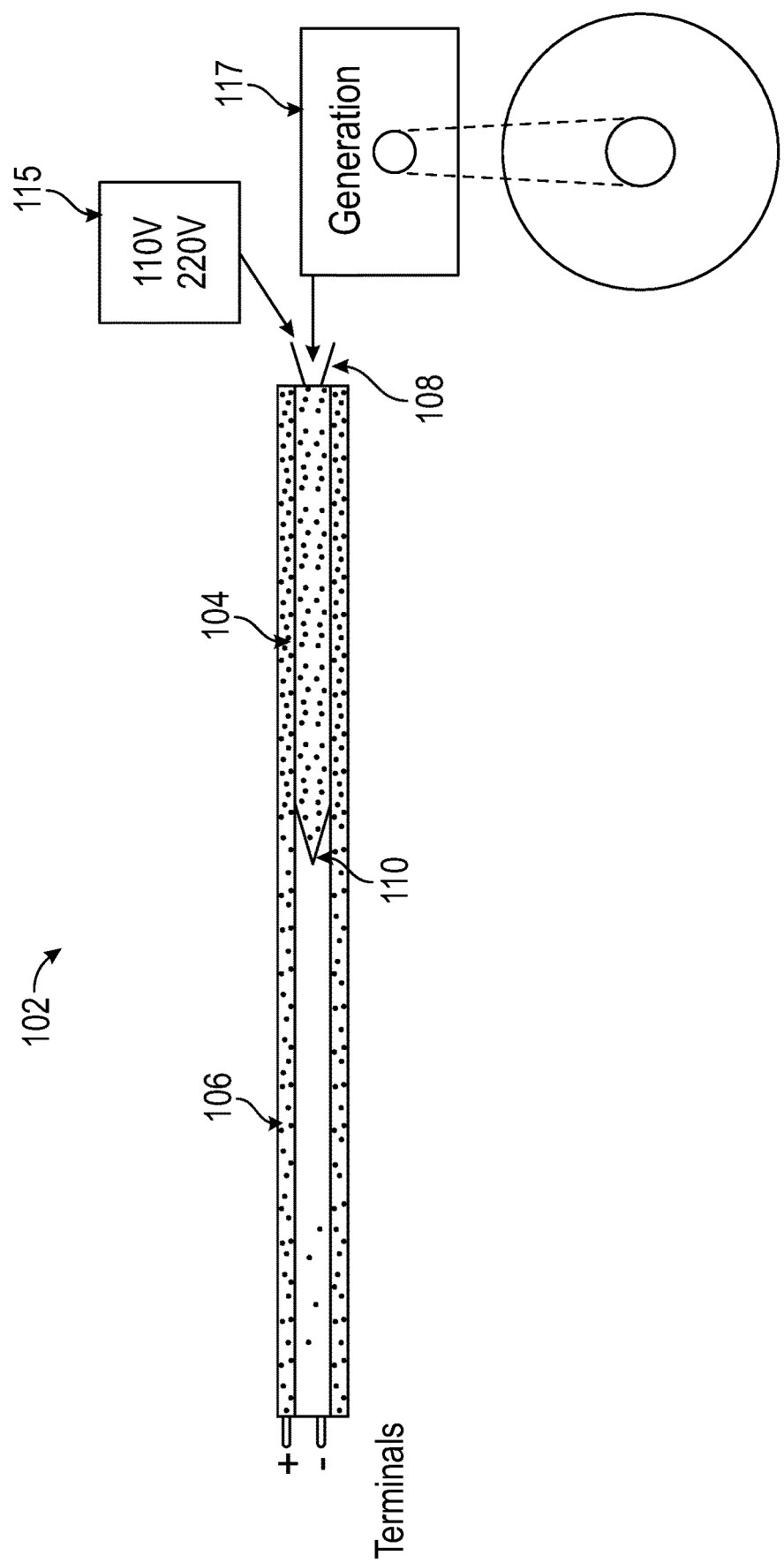

FIG. 1B illustrates example implementations of the hypercapacitor 102. As discussed above, the hypercapacitor 102 may be electrically couplable to an energy source and receive energy from the energy source. In some implementations, the energy source may comprise a power generation or charging system 117 and/or a power outlet 115 of the utility grid. The hypercapacitor 102 may be electrically couplable (e.g., removably coupled) to a power generation or charging system 117. The power generation or charging system 117 may be integrated with the device to which the hypercapacitor 102 provides energy. The power generation or charging system 117 may generate energy as a result of mechanical movement or motion such as rotation, translation, vibration and/or the like. For example, as shown in FIG. 1B, the power generation or charging system 117 may be operably coupled to a wheel and may generate energy in response to rotation of the wheel. The power generation or charging system 117 may provide energy to the ultracapacitor portion 104. The power generation or charging system 117 may toggle between providing energy to the ultracapacitor portion 104 and not providing energy to the ultracapacitor portion 104 and may so toggle automatically and/or manually as discussed herein.

The power generation or charging system 117 may continuously provide energy to the hypercapacitor 102 as energy is generated at the generation system 117. This may continuously charge the ultracapacitor portion 104. For example, as described with reference to FIGS. 3-10, the hypercapacitor 102 may be integrated with an electric vehicle and may receive energy from a power generation system of the electric vehicle that generates energy for example as the vehicle is in motion. Integrating the hypercapacitor 102 with a power generation system 117 may significantly improve the range that the vehicle may travel because the hypercapacitor 102 is being continuously charged as the vehicle travels. Advantageously, the hypercapacitor 102 may be capable of being fully charged by a power generation system 117 as the vehicle travels over a short distance, for example over less than a mile.

The hypercapacitor 102 may be electrically couplable (e.g., removably coupled) to the utility grid or mains electricity. For example, the ultracapacitor portion 104 of the hypercapacitor 102 may be electrically couplable to a standard low voltage plug or outlet 115 such as 110 volt outlets used in the United States utility power grid or 220 volt outlets used in European utility power grids. Energy from the outlet 115 (e.g. standard 100 or 110 volt outlet) may be provided to the ultracapacitor portion 104 of the hypercapacitor 102, for example, via the inbound diode(s) 108, and may charge the ultracapacitor portion 104 and/or the hypercapacitor 102.

Advantageously, the ultracapacitor portion 104 may not require high voltage plugs to charge, such as are commonly required by energy devices in use today such as standard battery electric vehicles. The ability to charge the ultracapacitor portion 104 without the use of a high voltage plug may advantageously facilitate quick and efficient charging at accessible locations (e.g., any standard 110V or 220V outlet) while reducing the need for significant changes to infrastructure (e.g., reducing or eliminating construction of charging stations for electric vehicles for general public use) and reducing the need for construction of at-home high voltage plugs or outlets, which may provide a benefit to quality of the environment by reducing construction.

Figure 2:
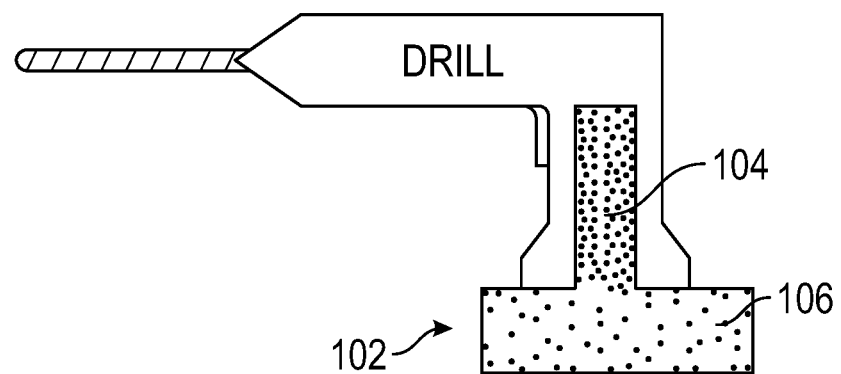
FIG. 2 illustrates an example implementation of a hypercapacitor in a power tool.

As discussed herein, capacitors such as the ultracapacitor portion 104 may be charged quickly (e.g., much faster than batteries). Inbound energy, such as from the power generation or charging system 117 and/or utility grid outlets 115 (e.g., 110 volt outlets), provided to the ultracapacitor portion 104 may charge the hypercapacitor 102 quickly. For example, the hypercapacitor 102 may be charged to a capacity voltage level (such as 400 V) in less than 30 minutes, less than 15 minutes, less than 10 minutes, less than 5 minutes, or less than 1 minute. In some embodiments, the hypercapacitor 102 may increase from zero volts to a required operational voltage or voltage capacity (e.g., 400 volts or any other voltage as required and/or desired) in 15 minutes or less than 15 minutes, for example when plugged into the utility grid via a standard 110 volt outlet or 220 volt outlet. In some embodiments, the hypercapacitor 102 may increase from zero volts to a required operational voltage or voltage capacity (e.g., 400 volts or any other voltage as required and/or desired) in 4-8 minutes when plugged into the utility grid via a standard 110 volt outlet or 220 volt outlet. In some embodiments, the hypercapacitor 102 may increase from zero volts to a required operational voltage for a power tool (such as illustrated in FIG. 2) in 2 minutes when plugged into the utility grid via a standard 110 volt outlet or 220 volt outlet.

In accordance with several embodiments, as the ultracapacitor portion 104 is charged by inbound energy the voltage of the ultracapacitor portion 104 will increase. The increase in energy (e.g., voltage) at the ultracapacitor portion 104 is represented by the increased dot density shown in FIG. 1B. As the voltage of the ultracapacitor portion 104 increases, the inbound diode(s) 108 may trap energy in the ultracapacitor portion 104 by biasing the direction of energy flow toward the ultracapacitor portion 104. This may facilitate the transfer of energy from the ultracapacitor portion 104 to the energy retainer portion 106. As energy in the ultracapacitor portion 104 (shown by dot density in FIG. 1B) increases relative to the energy in the energy retainer portion 106

(shown by dot density in FIG. 1B), energy may be more likely to transfer from the ultracapacitor portion 104 to the energy retainer portion 106. The outbound diode(s) 110 may trap energy in the energy retainer portion 106 by biasing the direction of energy flow toward the energy retainer portion 106. This may increase the energy stored in the energy retainer portion 106 by facilitating the transfer of energy from the ultracapacitor portion to the energy retainer portion 106. This may increase the operating time of the hypercapacitor 102, for example in instances where the hypercapacitor 102 is not receiving energy continuously from a power generation system 117.

The energy retainer portion 106 may provide energy to a load such as any device that requires energy, for example via a connection at the terminals. For example, when the hypercapacitor 102 is incorporated into an electric vehicle, the energy retainer portion 106 may provide energy to the motor of the vehicle, for example a traction motor and/or to other devices or systems of the vehicle that require energy or power. In some embodiments, the energy retainer portion 106 may be configured to provide its entire voltage carrying capacity to a load without ceasing operation or decreasing in operational functionality.

With continued reference to FIGS. 1A-1B, in some embodiments the hypercapacitor 102 may comprise and/or be electrically coupled to a battery management system (not shown) or other control or management system. The battery management system may include a controller. For example, the battery management system may monitor and control the flow of energy to and from the various components and the conditions under which the flow of energy is to occur. In some embodiments, the battery management system may be in electrical communication with the energy retainer portion 106 and/or a load and may monitor and/or control the energy that is provided from the energy retainer portion 106 to a load, such as the motor of an electric vehicle. In some embodiments, the battery management system may be in electrical communication with the ultracapacitor portion 104 and may monitor and/or control the energy that is provided to the ultracapacitor portion 104 from an energy source. In some embodiments, the battery management system may be in electrical communication with the ultracapacitor portion 104 and the energy retainer portion 106 and may monitor and/or control the energy that is provided to the ultracapacitor portion 104 and the energy that is provided from the energy retainer portion 106. In some embodiments, the battery management system may monitor and/or control the energy that is provided from the ultracapacitor portion 104 to the energy retainer portion 106.

Figure 1C:
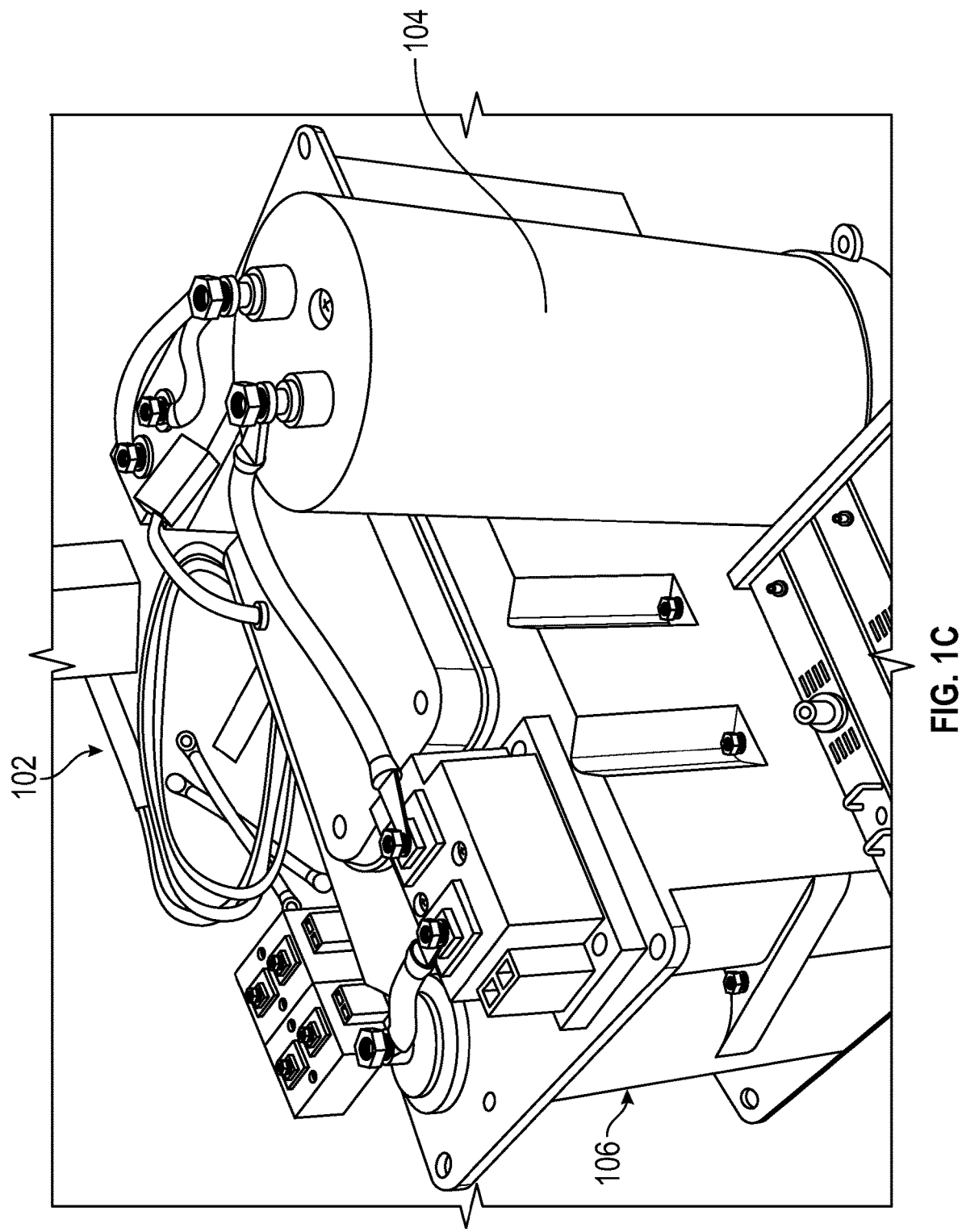
FIG. 1C illustrates an example embodiment of a hypercapacitor.

FIG. 1C illustrates an example embodiment of a hypercapacitor 102. In this example, the hypercapacitor 102 comprises an ultracapacitor 104 and an energy retainer portion 106. The energy retainer portion 106 includes a battery (e.g., nickel-cadmium battery, lithium ion battery, or other type of battery). The ultracapacitor 104 is electrically coupled to the energy retainer portion 106. The hypercapacitor 102 shown in FIG. 1C may operate as described with reference to FIGS. 1A-1B.

Example Implementations of the Hypercapacitor

The hypercapacitor 102 can be used in any device or system that uses, stores or requires energy such as electric vehicles, power tools, building energy/power systems, manufacturing energy/power systems, games, toys, electronics, computers, and the like. The hypercapacitor 102 may be modularly used in and/or integrated into various devices or systems. For example, the hypercapacitor 102 may be integrated with the assembly of the device to which it provides energy in a removable manner or in a fixed manner. As an example, the lithium ion battery of a standard electric vehicle may be removed and replaced with the hypercapacitor 102. The hypercapacitor 102 may comprise electrical features to facilitate easy integration into various devices. For example, the hypercapacitor may be capable of storing and/or providing various voltages such as may be required by various devices or systems. For example, in some embodiments, the hypercapacitor 102 may be capable of storing and providing 400 volts to the load of a device with which it is integrated, and in some embodiments, the hyperapacitor 102 may be capable of storing and providing 20 volts to the load of a device with which it is integrated. The hypercapacitor 102 may comprise physical features to facilitate easy integration into various devices. For example, the hypercapacitor 102 may comprise various shapes and/or sizes to facilitate integration into various devices.

FIG. 2 illustrates an example implementation of the hypercapacitor 102 into a power tool such as a drill. The hypercapacitor 102 may comprise similar components and/or operational functionality as described elsewhere herein, for example with reference to FIGS. 1A-1C. As shown, the hypercapacitor 102 comprises an ultracapacitor portion 104 electrically coupled to an energy retainer portion 106. The ultracapacitor portion 104 may receive energy from an energy source and increase in voltage (shown by dot density in FIG. 2). As the ultracapacitor portion 104 increases in energy (e.g., voltage), the energy stored in the ultracapacitor portion 104 may be more likely to transfer to the energy retainer portion 106. For example, when the energy (e.g., voltage) in the energy retainer portion 106 (shown by dot density in FIG. 2) is less than the energy (e.g., voltage) in the ultracapacitor portion 104 (shown by dot density in FIG. 2), the energy retainer portion 106 may be more amenable to receiving energy from the ultracapacitor portion 104.

The hypercapacitor 102 comprises physical characteristics to facilitate integration with the power drill. For example, as shown, the ultracapacitor portion 104 of the hypercapacitor 102 is sized and shaped appropriately to fit into the handle of the power drill. The energy retainer portion 106 is also sized and shaped appropriately to facilitate integration with the handle of the power drill. The hypercapacitor 102 may comprise electrical characteristics to facilitate integration with the power tool. For example, the hypercapacitor 102 may be configured to store and provide a voltage level as required by the power drill.

The hypercapacitor 102 may be configured to be electrically couplable (e.g., removably coupled) to a utility grid via standard outlets, such as 110V or 220V outlets, such as described for example with reference to FIG. 1B. The standard outlets (110V, 220V) may provide energy to the hypercapacitor 102 to charge the hypercapacitor 102. The hypercapacitor 102 may be charged to a voltage level to operate the power drill in a short amount of time (e.g., much shorter than charge times of standard batteries in current use in power tools. For example, the hypercapacitor 102 may be charged to a voltage capacity (e.g., fully charged from zero volts) in less than 10 minutes, less than 8 minutes, less than 4 minutes or less than 1 minute. The charge time may vary, depending at least in part on the operational requirements of the power tool or other device with which the hypercapacitor 102 is integrated and/or the energy source provided to the hypercapacitor 102.

In some embodiments, the power drill comprises a power generation system (not shown) which may comprise similar operational functionality to the power generation system 115, described for example with reference to FIG. 1B. For example, the power generation system may generate power based on mechanical movement of the drill, such as rotation of the drill bit. The power generation system may be electrically coupled to the hypercapacitor 102 and may provide energy to the hypercapacitor 102. This may prolong the high voltage levels stored in the hypercapacitor 102 and prolong operation of the power drill, for example, before the hypercapacitor 102 must be connected to a standard outlet (110V, 220V) to be recharged. In some embodiments, the power drill does not comprise a power generation system and the hypercapacitor 102 may receive energy solely from the utility grid via standard outlets (110V, 220V, depending on the country or region) and does not require high-power (e.g., higher than standard low-power outlets for the country or region) outlets or charging stations.

FIG. 2 is shown as an example and is not meant to be limiting of the scope of implementation or applicability of the present disclosure. The hypercapacitor 102 may be implemented in any device in a similar manner to that described with reference to the power drill of FIG.

Example Hypercapacitor Implementation in an Electric Vehicle

FIGS. 3-10 illustrate example implementations of the hypercapacitor 102 incorporated into an example electric vehicle. FIGS. 3-10 are not meant to be limiting. The hypercapacitor 102 may be incorporated into any electric vehicle or any other system or device that uses or stores energy. The hypercapacitor may be capable of storing much more energy per weight than standalone storage devices. For example, a hypercapacitor installed in an electric vehicle, such as those discussed in FIGS. 3-10, may weigh 300 lbs. or less, whereas normal lithium ion batteries in a standard electric vehicle might weigh 1500 lbs. or more for the same comparable energy storage capability. Further, in part because of the reduced weight of a hypercapacitor storage system such as those illustrated in FIGS. 3-10, (when compared to existing energy storage systems known in the art) a vehicle incorporating a hypercapacitor energy storage system may have a significantly increased or extended range (in some cases as large as three times the extended range) when compared to currently available electric vehicles with standard energy storage systems.

Figure 3:
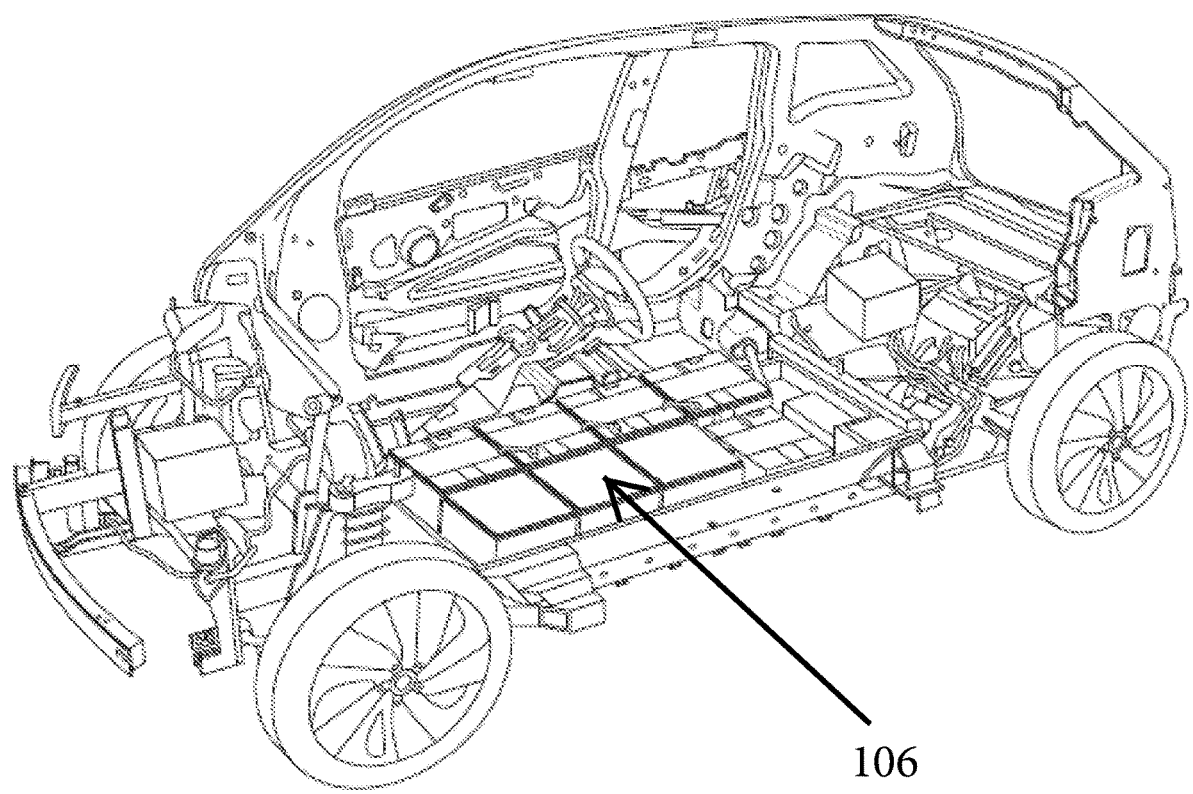
FIG. 3 illustrates an example implementation of a hypercapacitor in an electric vehicle.

FIG. 3 illustrates an example vehicle into which the hypercapacitor 102 may be incorporated. The hypercapacitor 102 may be incorporated as part of the assembly of the vehicle and may be mobile with the vehicle. The hypercapacitor 102 may comprise similar components and/or operational functionality as described elsewhere herein, for example with reference to FIGS. 1A-1C. The hypercapacitor 102 may comprise an energy retainer portion 106 which may comprise one or more batteries such as a battery field as shown in FIG. 3. In some embodiments, the hypercapacitor 102 may be electrically couplable to a utility grid via standard outlets such as 110V or 220V outlets. In some embodiments, the hypercapacitor 102 may be electrically coupled to a power generation or charging system of the vehicle.

Figure 4:
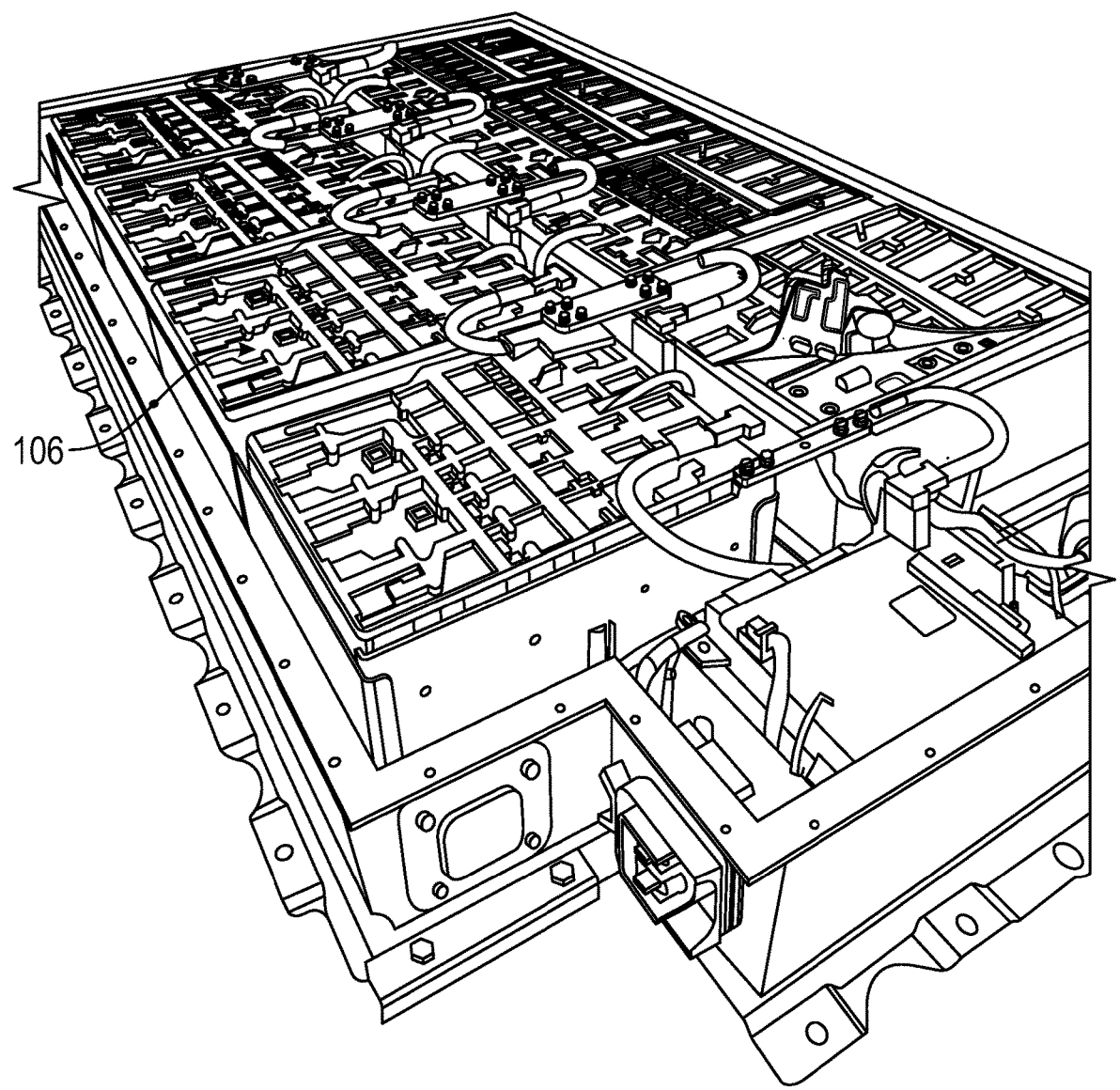
FIG. 4 illustrates an example embodiment of an energy retainer of a hypercapacitor comprising a battery field that may be incorporated into an electric vehicle.

FIG. 4 illustrates an example embodiment of an energy retainer portion 106 of a hypercapacitor 102 which may be implemented in a vehicle, for example the vehicle shown in FIG. 3. The energy retainer portion 106 comprises a battery field. The energy retainer portion 106 may provide a 33 Kwh standard battery field, for example. The energy retainer portion 106 may include a plurality of individual battery units or modules. For example, as shown in FIG. 4, the energy retainer portion 106 may include eight individual battery units. The energy retainer portion 106 may store energy used to drive the motor of the vehicle. In accordance with several embodiments, the energy retainer portion 106 may not comprise lithium ion batteries, which may provide a benefit to quality of the environment. In some embodiments, the energy retainer portion 106 may comprise and/or be electrically coupled to a fuse (not shown). The fuse may prevent the energy retainer portion 106 from being overcharged and/or receiving too much energy (for example, from the ultracapacitor portion 104 as shown in FIGS. 1A-1C). For example, if the energy retainer portion 106 reaches a certain voltage level, the fuse may advantageously prevent the energy retainer portion 106 from receiving any more energy to charge the energy retainer portion 106.

Figure 5:
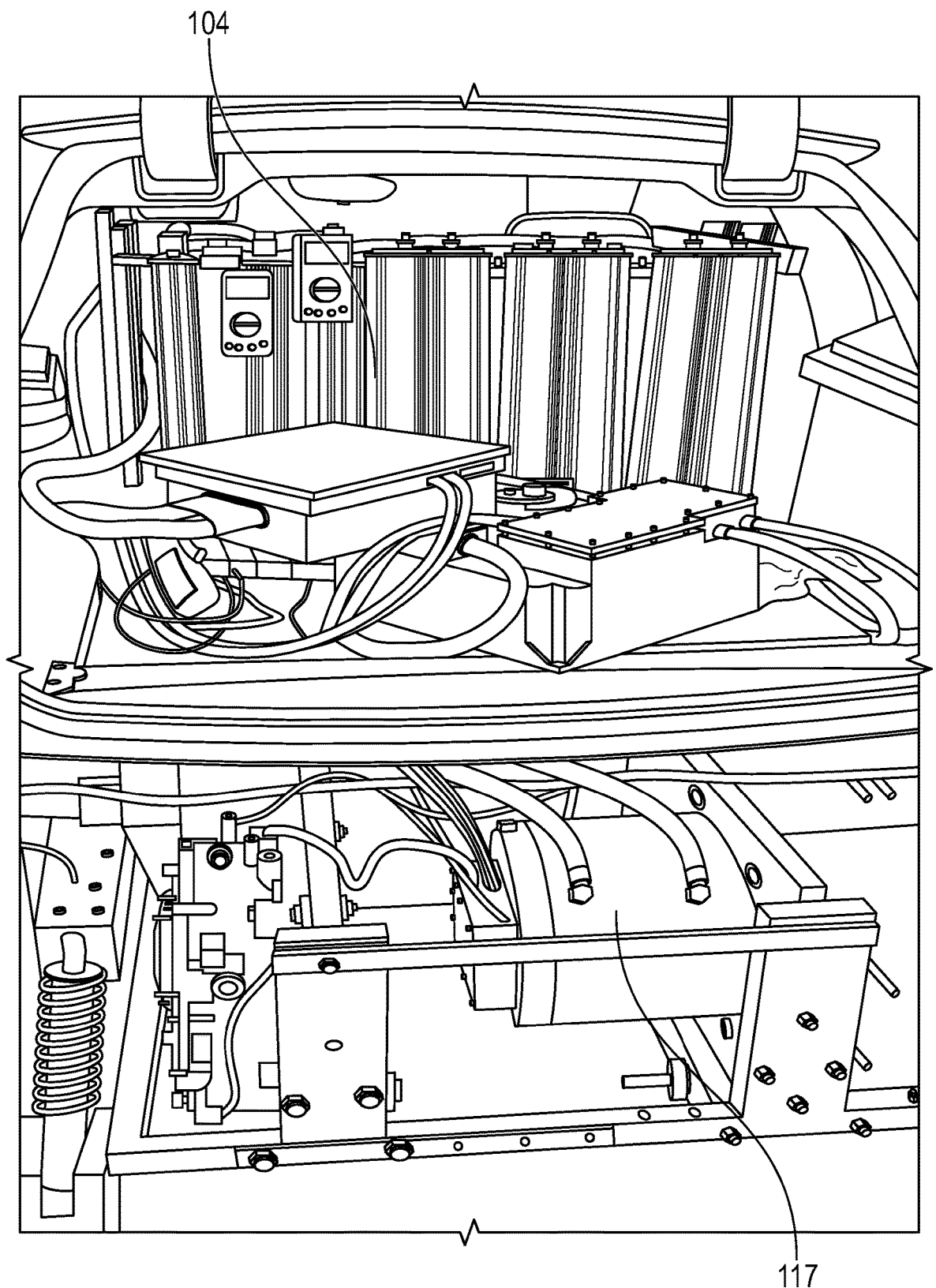
FIG. 5 illustrates an example embodiment of an ultracapacitor of a hypercapacitor and a power generation system incorporated into an electric vehicle.

FIG. 5 illustrates an example embodiment of an ultracapacitor portion 104 of a hypercapacitor 102 and a power generation or charging system 117 which may be implemented in a vehicle, for example the vehicle shown in FIG. 3. As discussed herein, the ultracapacitor portion 104 may comprise one or more ultracapacitors and/or supercapacitors, such as described herein. The power generation or charging system 117 may be electrically coupled to the ultracapacitor portion 104 and may provide energy to the ultracapacitor portion 104 to charge the ultracapacitor portion 104, for example as the vehicle is in motion. This may prolong high voltage levels in the hypercapacitor 102 which may prolong operation of the vehicle. In some embodiments, the power generation or charging system 117 may be electrically coupled to the ultracapacitor portion 104 via high voltage wiring. In some embodiments, the power generation or charging system 117 may be electrically coupled to the ultracapacitor portion 104 without high voltage wiring. The ultracapacitor portion 104 may be electrically coupled to the energy retainer portion 106 (not shown) via high voltage line(s) and/or directly and/or via wiring which may stabilize the voltage of the ultracapacitor portion 104 and prevent voltage loss due to self-discharge. The ultracapacitor portion 104 may provide energy to the energy retainer portion 106 when the energy retainer portion reaches a low voltage threshold level such as 350V or 360V. The ultracapacitor portion 104 may stop providing energy to the energy retainer portion when the energy retainer portion reaches a high voltage threshold level such as 370V, 380V, 390V, 400V or the like.

Figure 6:
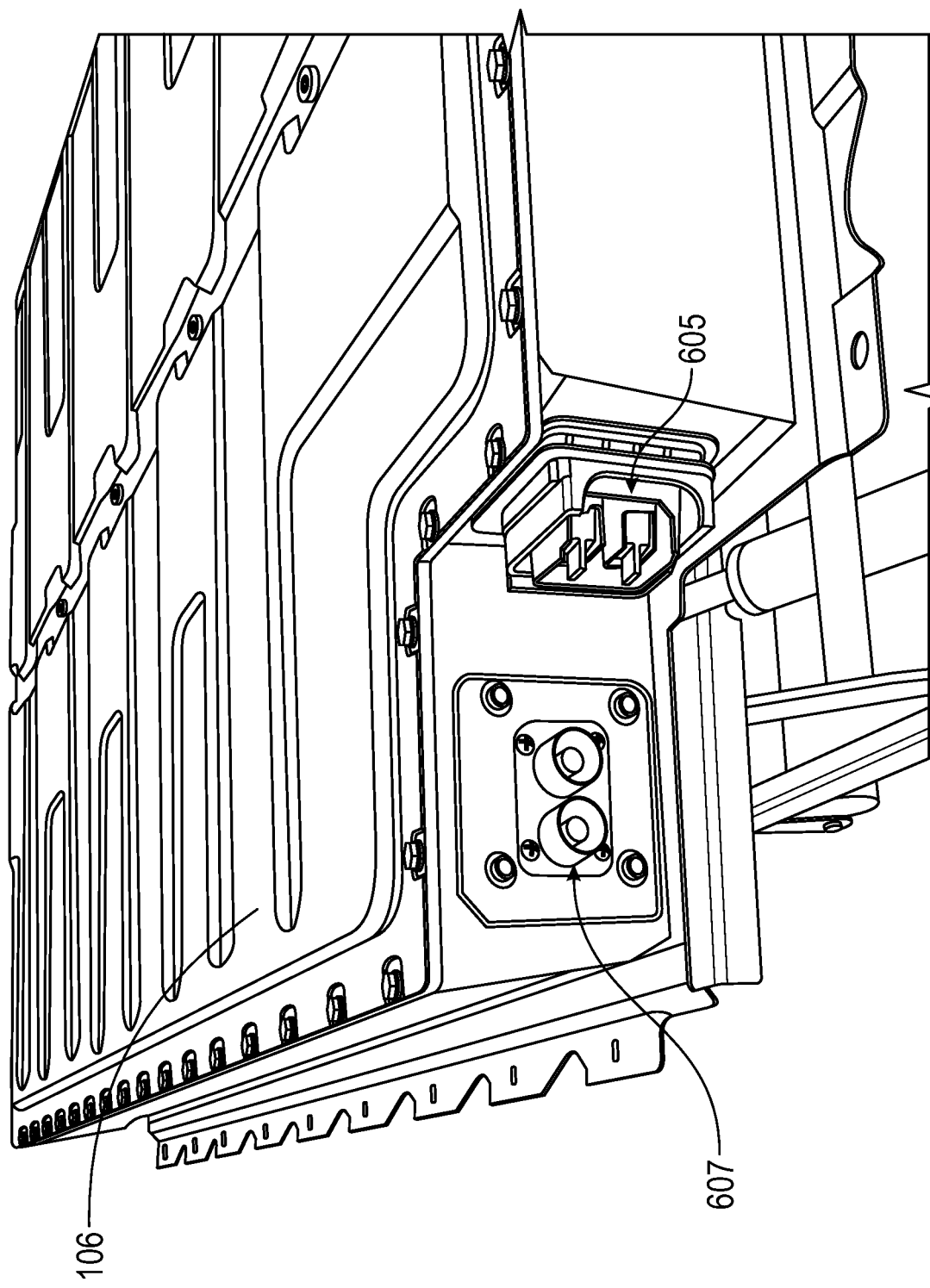
FIG. 6 illustrates an example embodiment of electrical connections of an energy retainer of a hypercapacitor comprising a battery field that may be incorporated into an electric vehicle.

FIG. 6 illustrates an example embodiment of an energy retainer portion 106 of a hypercapacitor 102 such as may be used in a vehicle as shown FIGS. 3-4. As shown in FIG. 6, the energy retainer portion 106 may be enclosed by a housing such that the energy retainer portion 106 is not substantially physically exposed. The housing of the energy retainer portion 106 may include electrical connectors 607, 605. The electrical connectors 607, 605 may be electrically coupled to the energy retainer portion 106 and may be capable of providing energy to the energy retainer portion 106 to charge the energy retainer portion 106. The electrical connectors 607, 605 may be configured to be removably electrically coupled to the ultracapacitor portion 104. The ultracapacitor portion 104 may provide energy to the energy retainer portion 106 to charge the energy retainer portion 106 directly via the electrical connectors 607, 605.

Figure 7:
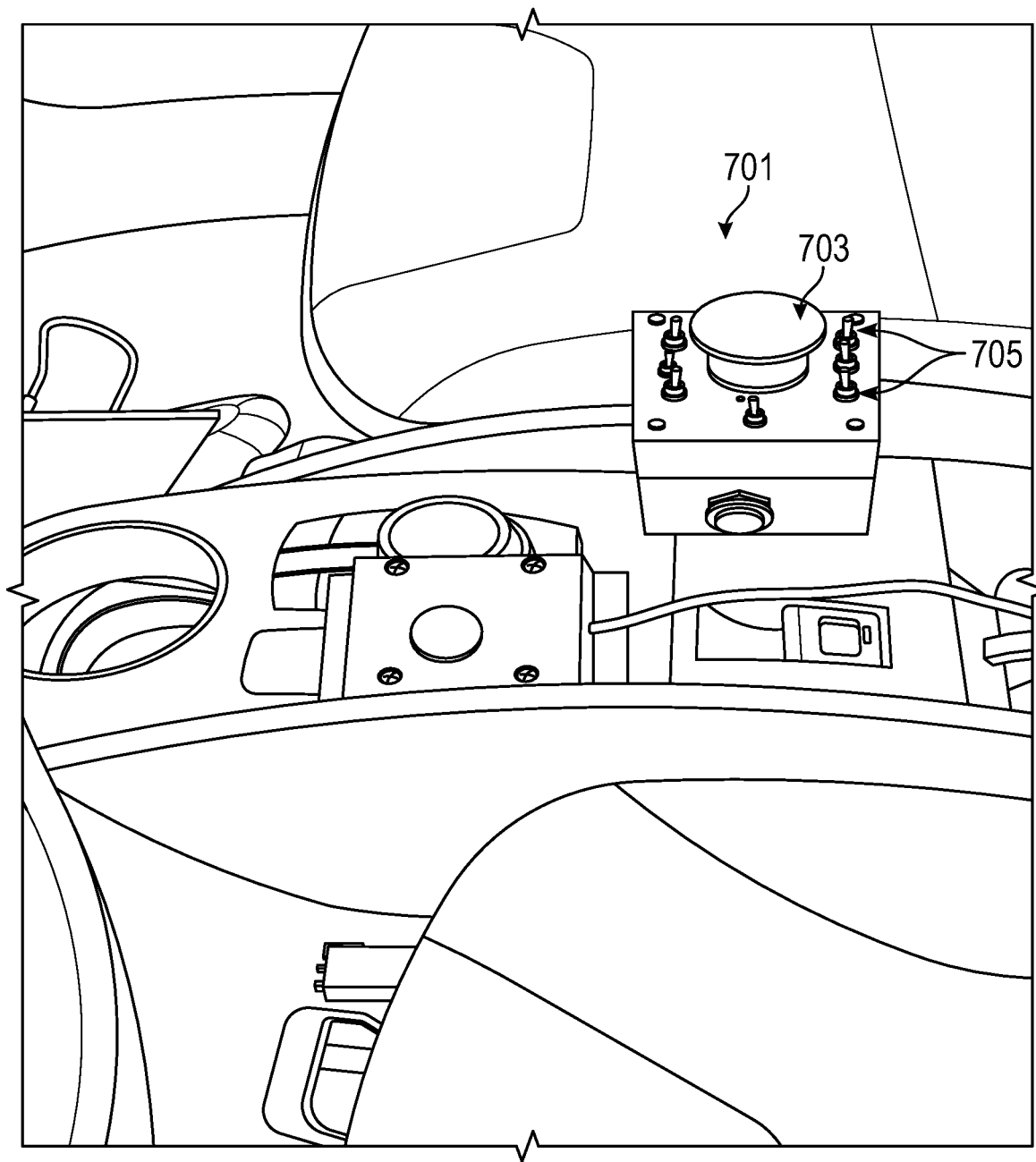
FIG. 7 illustrates an example embodiment of a toggle module for controlling the flow of energy between a power generation or charging system, a hypercapacitor and/or a load.

FIG. 7 illustrates an example embodiment of a toggle module 701. The toggle module 701 shown in FIG. 7 may be incorporated into, implemented by, or used in conjunction with, the other systems, devices, or components described herein, such as the hypercapacitor 102 and/or a power generation or charging system 117 for use in a vehicle such as the vehicle shown in FIG. 3. The toggle module 701 may be electrically coupled to a power generation or charging system 117 of the vehicle, as well as the ultracapacitor portion 104 (not shown) and the energy retainer portion 106 (not shown) of the hypercapacitor 102. The toggle module 701 may control charging of the ultracapacitor portion 104 and/or the energy retainer portion 106. For example, the toggle module 701 may control when the power generation or charging system 117 provides energy to the ultracapacitor portion 104 and/or when the ultracapacitor portion 104 provides energy to the energy retainer portion 106. The toggle module 701 may be located within an interior region of the vehicle, such as adjacent to a driver as shown in FIG. 7.

The toggle module 701 may include one or more buttons, switches or other mechanisms that may be operated by a user, such as a driver of the vehicle. For example, the toggle module 701 may include a button 703 and one or more switches 705. The button 703 and switches 705 are given as examples of user-operable mechanisms and are not meant to be limiting. In some embodiments, toggle module 701 may include other user-operable mechanisms, such as a capacitive touchscreen or electronic actuator. Operation of the one or more switches 705, such as by a user, may cause the generator to charge the ultracapacitor portion 104 or to cease charging the ultracapacitor portion 104. Each of the one or more switches 705 may correspond to a unique capacitor of the ultracapacitor portion 104. Operation of the button 703, such as by a user, may cause the ultracapacitor portion 104 to provide energy to the energy retainer portion 106 or to cease providing energy to the energy retainer portion 106. Additionally, and/or alternatively to manually toggling between charging and not charging the ultracapacitor portion 104 and/or the energy retainer portion 106 described with reference to FIG. 7, automatically toggling may occur based on various resistances, voltages etc., as discussed herein.

Figure 8:
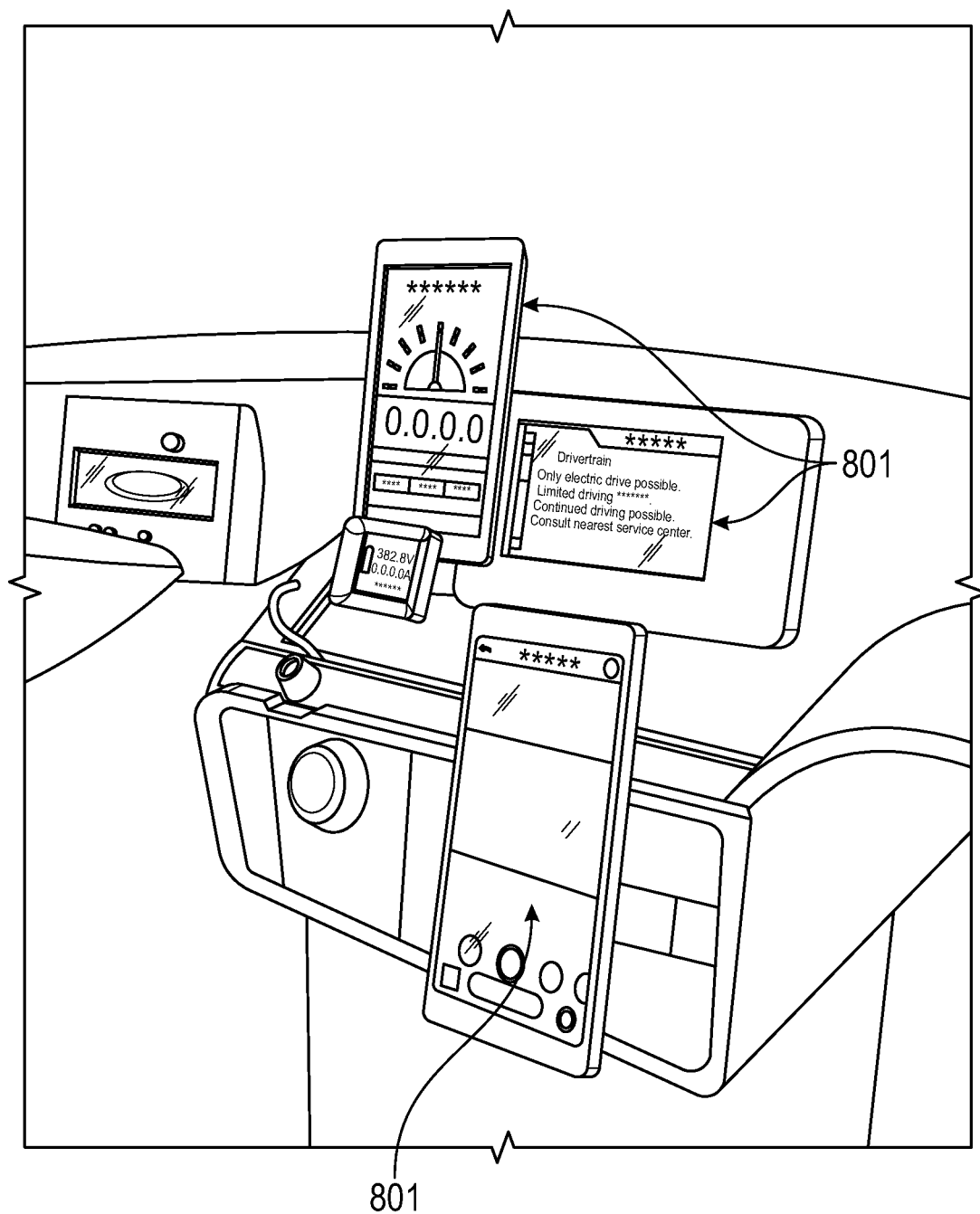
FIG. 8 illustrates example embodiments of instruments that may be incorporated in an electric vehicle and used in conjunction with the other systems, devices, or components described herein.

FIG. 8 shows various instruments 801 which may be incorporated into, implemented by, or used in conjunction with, the other systems, devices, or components described herein, such as the hypercapacitor 102 and/or a power generation or charging system 117 for use in a vehicle such as the vehicle shown in FIG. 3. In some embodiments, the instruments 801 may be configured to display information to a user, such as a driver of a vehicle. For example, the instruments 801 may display voltage and/or amperage of components of the vehicle such as the hypercapacitor 102 and/or a power generation or charging system 117. The instruments 801 may display, for example, charge rate and/or charge status of the ultracapacitor 104 and the energy retainer portion 106. In some embodiments, the instruments 801 may be configured to receive user input, which may control operation and/or functionality of the systems as described herein.

Figure 9:
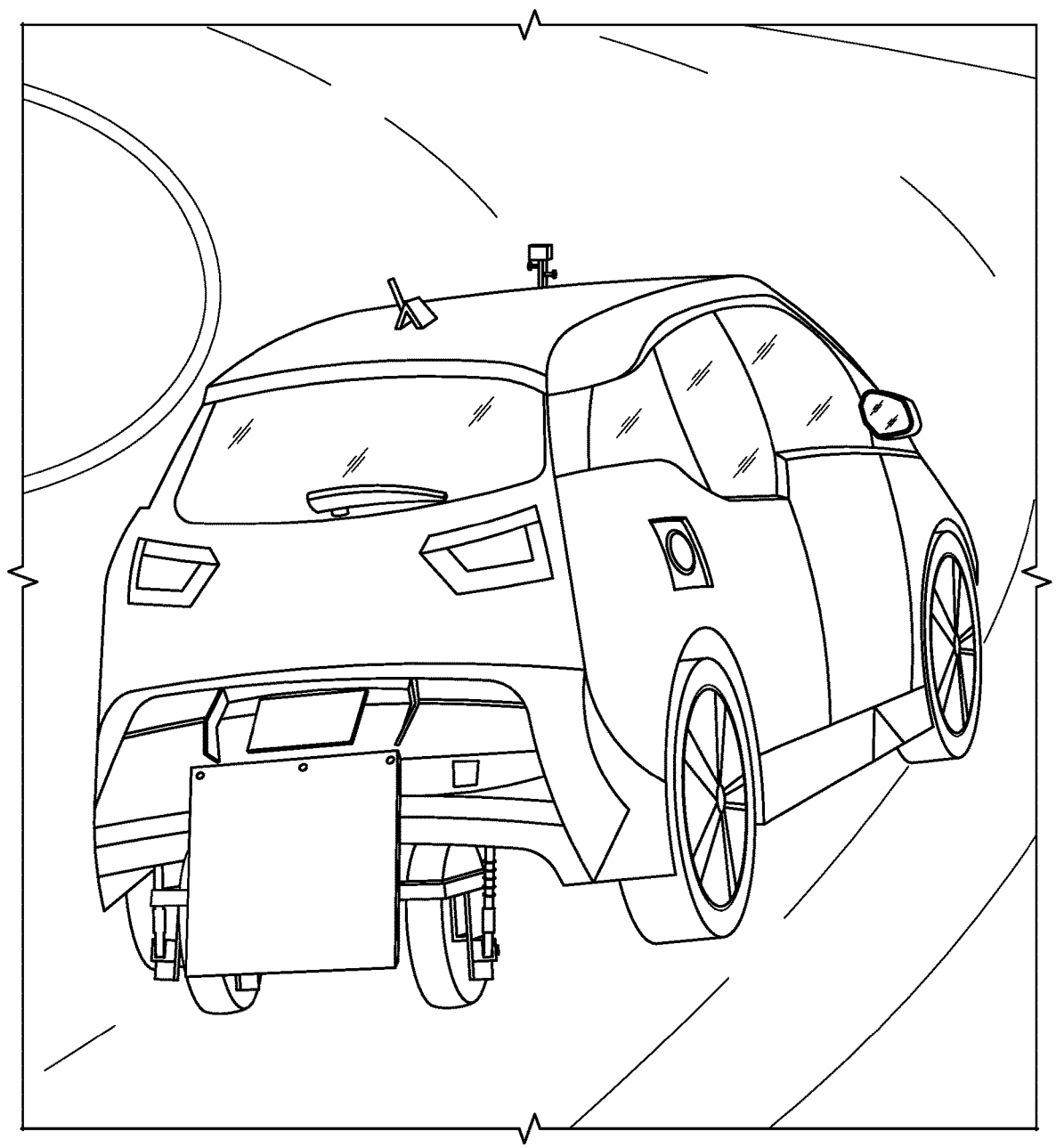
FIG. 9 illustrates an example vehicle employing a power generation or charging system and a hypercapacitor.

FIG. 9 shows an example vehicle employing the systems and components as discussed herein such as a power generation or charging system 117, a hypercapacitor 102 and/or other components discussed herein. The vehicle shown in FIG. 9 is not meant to be limiting and any vehicle, vessel, equipment, device or system may incorporate the systems and components discussed herein.

FIG. 10 illustrates a chart of example data relating to voltage generation and usage of a power generation or charging system 117 and hypercapacitor 102 operating in a vehicle while travelling a distance. As shown in FIG. 10, the vehicle starts at a location 0 and travels a distance of 6.6 miles during which the power generation or charging system 117 and hypercapacitor 102 are operating within the vehicle. The chart of FIG. 10 shows the voltage generated by the power generation or charging system 117 and provided to the ultracapacitor portion 104 (left column; denominated ultracapacitor voltage) and the voltage provided from the energy retainer portion 106 to the motor of the vehicle (right column; denominated battery field voltage). As shown in the chart of FIG. 10, the ultracapacitor voltage and energy retainer voltage begin at 352.4V and 351.2V, respectively, when the vehicle is at location 0. Upon starting the vehicle, the voltage of the ultracapacitor portion 104 and/or the energy retainer portion 106 may decrease significantly, for example by about 5V. This may be due to the large amounts of energy required to start the motor of a vehicle and/or to accelerate the vehicle from rest.

As the vehicle travels, the power generation or charging system 117 may generate energy to transfer to the ultracapacitor 104. As the ultracapacitor portion 104 receives energy, for example, from the power generation or charging system 117, the ultracapacitor portion 104 may increase in voltage. The ultracapacitor portion 104 may transfer energy to the energy retainer portion 106 to charge the energy retainer portion 106.

As shown in the graph of FIG. 10, as the vehicle travels from mile 1 to mile 6.6 the voltage in the ultracapacitor portion 104 remains relatively constant (e.g., 345.3 to 345.5). The increase in the ultracapacitor portion 104 voltage of 0.2V may be due to the energy received from the energy generating components such as the power generation or charging system 117.

As shown in the graph of FIG. 10, as the vehicle travels from mile 1 to mile 6.6 the voltage in the energy retainer portion 106 may increase from 346V to 349.02V. The increase in the energy retainer portion 106 voltage of about 3V may be due to energy received from the ultracapacitor portion 104. As shown by the data of the graph of FIG. 10, as the vehicle travels, energy may be generated by the energy generating components such as the power generation or charging system 117, etc., and may be provided to the ultracapacitor portion 104 which may in turn provide the energy to the energy retainer portion 106. This may sustain high voltage levels in the hypercapacitor 102 which may prolong the operation of the vehicle.

Additional Embodiments

As used herein, "system," "instrument," "apparatus," and "device" generally encompass both the hardware (for example, mechanical and electronic) and, in some implementations, associated software (for example, specialized computer programs for graphics control) components.

Further, the data processing and interactive and dynamic user interfaces described herein are enabled by innovations in efficient data processing and interactions between the user interfaces and underlying systems and components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a "data storage system" may be embodied in computing system that utilizes hard disk drives, solid state memories and/or any other type of non-transitory computer-readable storage medium accessible to or by a device such as an access device, server, or other computing device described. A data storage system may also or alternatively be distributed or partitioned across multiple local and/or remote storage devices as is known in the art without departing from the scope of the present disclosure. In yet other embodiments, a data storage system may include or be embodied in a data storage web service.

As used herein, the terms "determine" or "determining" encompass a wide variety of actions. For example, "determining" may include calculating, computing, processing, deriving, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (for example, send or receive data) in accordance with one or more of the aspects described.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A hypercapacitor apparatus for storing and providing energy, the apparatus comprising:
   at least one ultracapacitor electrically couplable to an energy source via one or more inbound diodes, wherein the one or more inbound diodes are biased toward the at least one ultracapacitor and wherein the at least one ultracapacitor is configured to:
   receive, via the one or more inbound diodes, inbound energy from the energy source; and
   store the inbound energy as a first energy in an electric field of the at least one ultracapacitor; and
an energy retainer electrically coupled to the at least one ultracapacitor via one or more outbound diodes, wherein the one or more outbound diodes are biased toward the energy retainer and wherein the energy retainer is configured to:
   receive, via the one or more outbound diodes, outbound energy from the at least one ultracapacitor in response to a voltage level of the energy retainer dropping below a low threshold value;
   store said outbound energy as a second energy of the energy retainer; and
   convey the second energy to a load.

2. The apparatus of claim 1, wherein the energy source is a utility grid and wherein the at least one ultracapacitor is further configured to:
   be electrically couplable to the utility grid via a standard 110 volt or 220 volt outlet; and
   increase the first energy by a voltage capacity of the at least one ultracapacitor in less than 30 minutes; and
   wherein the energy retainer is further configured to not receive outbound energy from the at least one ultracapacitor in response to a voltage level of the energy retainer reaching a high threshold voltage value.

3. The apparatus of claim 1, wherein the energy source is a power generation system.

4. The apparatus of claim 1, wherein the at least one ultracapacitor comprises a plurality of ultracapacitors.

5. The apparatus of claim 1, wherein the energy retainer comprises one or more batteries.

6. The apparatus of claim 1, wherein the energy retainer comprises one or more capacitors.

7. The apparatus of claim 1, wherein the energy retainer does not comprise lithium ion batteries.

8. The apparatus of claim 1, wherein the energy retainer and the at least one ultracapacitor comprise a single integrated unit.

9. The apparatus of claim 1, wherein the energy retainer is electrically coupled to the at least one ultracapacitor via one or more high voltage lines.

10. The apparatus of claim 1, wherein the electrical coupling between the energy retainer and the at least one ultracapacitor stabilizes the voltage of the at least one ultracapacitor to prevent voltage loss of the first energy of the at least one ultracapacitor due to self-discharge.

11. The apparatus of claim 1, wherein the energy retainer is configured to receive outbound energy from the at least one ultracapacitor via the one or more outbound diodes based, at least in part, on a current voltage level of the at least one ultracapacitor.

12. The apparatus of claim 1, wherein the energy retainer is configured to receive outbound energy from the at least one ultracapacitor via the one or more outbound diodes based, at least in part, on a resistance in the one or more outbound diodes.

13. The apparatus of claim 1, further comprising a battery management system, wherein the battery management system is electrically coupled to the energy retainer and configured to monitor the energy conveyed from the energy retainer to the load and control when the energy retainer conveys energy to the load.

14. The apparatus of claim 1, wherein the energy retainer is further configured to convey all of the second energy to the load.

15. A hypercapacitor apparatus for storing and providing energy, the apparatus comprising:
   at least one ultracapacitor electrically couplable to an energy source via one or more inbound diodes biased toward the at least one ultracapacitor, and wherein the at least one ultracapacitor is configured to:
     receive inbound energy from the energy source; and
     store the inbound energy as a first energy in an electric field of the at least one ultracapacitor; and
   an energy retainer electrically coupled to the at least one ultracapacitor via one or more outbound diodes biased toward the energy retainer, wherein the energy retainer and the at least one ultracapacitor comprise a single integrated unit and wherein the energy retainer is configured to:
     receive outbound energy from the at least one ultracapacitor to stabilize the voltage of the at least one ultracapacitor to prevent voltage loss of the first energy of the at least one ultracapacitor due to self-discharge;
     store said outbound energy as a second energy of the energy retainer; and
     convey the second energy to a load.

16. The apparatus of claim 15, wherein the energy source is a utility grid and wherein the at least one ultracapacitor is further configured to:
   be electrically couplable to the utility grid via a standard 110 volt or 220 volt outlet; and
   wherein the energy retainer is further configured to:
     receive, outbound energy from the at least one ultracapacitor in response to a voltage level of the energy retainer dropping below a low threshold value; and
     not receive outbound energy from the at least one ultracapacitor in response to a voltage level of the energy retainer reaching a high threshold voltage value.

17. The apparatus of claim 15, wherein the at least one ultracapacitor comprises a plurality of ultracapacitors and wherein the energy retainer comprises one or more batteries.

18. The apparatus of claim 15, wherein the energy retainer is configured to receive outbound energy from the at least one ultracapacitor via the one or more outbound diodes based, at least in part, on a resistance in the one or more outbound diodes.

19. The apparatus of claim 15, wherein the energy source is a power generation system.

20. The apparatus of claim 15, wherein the energy retainer is configured to receive outbound energy from the at least one ultracapacitor via the one or more outbound diodes based, at least in part, on a voltage level of the at least one ultracapacitor.

\* \* \* \* \*